US011742672B2

(12) United States Patent
Tivas

(10) Patent No.: US 11,742,672 B2
(45) Date of Patent: Aug. 29, 2023

(54) SYSTEM AND METHOD FOR PORTABLE ELECTRONIC DEVICE CASE ASSEMBLY

(71) Applicant: Nicholas Tivas, Brooklyn Park, MD (US)

(72) Inventor: Nicholas Tivas, Brooklyn Park, MD (US)

( * ) Notice: Subject to any disclaimer, the term of this patent is extended or adjusted under 35 U.S.C. 154(b) by 764 days.

(21) Appl. No.: 16/549,955

(22) Filed: Aug. 23, 2019

(65) Prior Publication Data

US 2021/0057928 A1 Feb. 25, 2021

(51) Int. Cl.
*H02J 7/00* (2006.01)
*G06F 1/16* (2006.01)
*H01R 13/518* (2006.01)
*H01R 31/02* (2006.01)
*H04R 3/00* (2006.01)
*H04M 1/72409* (2021.01)
*H04M 1/02* (2006.01)
*H01R 31/06* (2006.01)

(52) U.S. Cl.
CPC .............. *H02J 7/00* (2013.01); *G06F 1/1656* (2013.01); *H01R 13/518* (2013.01); *H01R 31/02* (2013.01); *H02J 7/0042* (2013.01); *H04M 1/724092* (2022.02); *H04R 3/00* (2013.01); *H01R 31/06* (2013.01); *H04M 1/0202* (2013.01)

(58) Field of Classification Search
CPC ......................................................... H02J 7/00
See application file for complete search history.

(56) References Cited

U.S. PATENT DOCUMENTS

| 6,058,319 A * | 5/2000 | Sadler ................. H04M 1/6083 455/575.1 |
| 2008/0150480 A1* | 6/2008 | Navid ................... H02J 7/0045 320/113 |
| 2015/0270734 A1* | 9/2015 | Davison ............... H04B 1/3888 320/103 |
| 2017/0110902 A1* | 4/2017 | Miller ................... H02J 7/0044 |
| 2017/0318145 A1* | 11/2017 | Gibbons .................. H04R 1/04 |

* cited by examiner

Primary Examiner — Robert Grant
(74) Attorney, Agent, or Firm — Bold IP, PLLC; Christopher Mayle

(57) ABSTRACT

A system and method for a portable electronic device case assembly is described that allows a user to use multiple types of chargers to charge their mobile electronic device using the portable electronic device case assembly. Further, the case assembly also provides an integrated auxiliary splitter that permits a user to plug in headphones or other auxiliary cables into the top and bottom of the personal computing device.

9 Claims, 7 Drawing Sheets

SYSTEM AND METHOD FOR PORTABLE ELECTRONIC DEVICE CASE ASSEMBLY

FIELD OF THE DISCLOSURE

This disclosure relates to the field of cases for portable electronic devices, and more specifically, to a case having an auxiliary splitter and charging ports integrated within the housing of the case.

BACKGROUND

Portable electronic devices have become a staple of modern day society. From toddlers to senior citizens, every person can now be found with one. Whether using the GPS on a phone to find your way around town, reading a book on a kindle while flying, or teleconferencing with work when on vacation, portable electronic devices have become invaluable for everyday activities. Even though portable electronic devices have become more advanced the devices still require added protection and to be charged more frequently.

Headphones are essential for listening to music without disturbing others, but conventional headphones lack the ability for sharing of audio among multiple people. One common method for trying to listen to music together is to share the left and right headphone pieces between two people. The disadvantages with this are clear, because this can be unsanitary and tends to limit the range of motion by forcing two people to be in very close proximity. A portable charger is needed when using more energy consuming applications for extended periods of time, and cords are necessary to necessary to charge the devices when a wireless station is not available. However, there are multiple proprietary and different types of charging ports for the various brands of portable electronic devices. Thus, exists a need for portable electronic device case providing a way to protect the portable electronic device as well allow for sharing audio among multiple people and permit charging with different types of cords.

SUMMARY

The disclosure presented herein relates to a case for an electronic device, comprising, a casing element comprising a back surface, wherein the back surface comprises an interfacing layer enclosed in the casing element, one or more sidewalls connected to the base surface; and electronic circuitry located in the interfacing layer, wherein the electronic circuitry comprises a plurality of charging adapters, the electronic circuitry further comprising an auxiliary splitter, a charging connector, wherein the charging connector is positioned on an outside of the casing element, and further wherein the charging connector is configured to be coupled through the electronic circuitry to a charging terminal of the electronic device, a charging connector, the auxiliary connector positioned on an outside of the casing element, wherein the auxiliary connecter is coupled through the auxiliary splitter to the audio output terminal of the electronic device, the charging connector connected to a charging cable, wherein the charging cable is connected to a breakout board, wherein the breakout board is configured to distribute power to one or more connecting cables, wherein the one or more connecting cables are wired in a parallel arrangement, wherein one or more connecting cables are connected to the one or more charging adapters at a first end, wherein the second end of the one or more charging adapters is a connector for receiving and connecting a compatible cord, wherein the charging connectors are configured to be accessible through one or more openings in the sidewall of the case, wherein one of the charging adapters is a lightning adapter, wherein one or more connecting cables are connected to the lightning adapter at a first end, wherein the second end of lightning adapter is a lightning connector for receiving and connecting to a lightning cord, wherein one of the charging adapters is a micro USB adapter, wherein one or more connecting cables connected to the micro USB adapter at a first end, wherein the second end of micro USB adapter is a micro USB connector for receiving and connecting to a USB C cord, wherein one of the charging adapters is a USB adapter, wherein one or more connecting cables connected to the USB adapter at a first end, wherein the second end of USB adapter is a USB connector for receiving and connecting to a micro USB cord, wherein one of the charging adapters is a USB C adapter, one or more connecting cables connected to the USB C adapter at a first end, wherein the second end of USB C adapter is a USB C connector for receiving and connecting to a USB C cord, wherein the electronic device a mobile computing device.

The disclosure presented herein also relates to case for an electronic device, comprising, a casing element comprising a back surface and an interfacing layer enclosed in the casing element, wherein the electronic device is configured to be placed against the back surface of the casing element and on top of the interfacing layer, one or more sidewalls connected to the back surface, electronic circuitry in the interfacing layer, wherein the electronic circuitry comprises a plurality of charging adapters and an auxiliary splitter, wherein one or more connecting cables are connected to the plurality of charging adapters at a first end and wherein the second end of the one or more connecting cables is a connector for receiving and connecting a compatible cord, wherein the one or more connecting cables are accessible through one or more openings in the one or more sidewalls of the casing element, wherein one of the plurality of charging adapters is a lightning adapter, wherein a connecting cable of the one or more connecting cables is configured to connect to the lightning adapter at a first end, wherein the second end of the lightning adapter is a lightning connector for receiving and connecting to a lightning cord, wherein one of the plurality of charging adapters is a micro USB adapter, wherein a connecting cable of the one or more connecting cables is configured to connect to the micro USB adapter at a first end, wherein the second end of the micro USB adapter is a micro USB connector for receiving and connecting to a USB C cord, wherein one of the plurality of charging adapters is a USB adapter, wherein a connecting cable of the one or more connecting cables is configured to connect to the USB adapter at a first end, wherein the second end of the USB adapter is a USB connector for receiving and connecting to a micro USB cord, wherein one of the plurality of charging adapters is a USB C adapter, wherein the connecting cable of the one or more connecting cables is configured to connect to the USB C adapter at a first end, wherein the second end of the USB C adapter is a USB C connector for receiving and connecting to a USB C cord, a charging connector, wherein the charging connector is positioned on an outside of the casing element, wherein the charging connector is coupled through the electronic circuitry to a charging port of the electronic device, wherein the charging connector is configured to connect to a charging cable, wherein the charging cable is configured to connect to a breakout board, wherein the breakout board is configured to distribute power to the one or more connecting cables, an auxiliary connector, wherein the auxiliary connector is positioned on an outside of the casing element, wherein the auxiliary connecter is coupled through the auxiliary splitter to an audio output port of the electronic device, wherein the auxiliary splitter is configured to send electrical signals to a first and a second audio output terminal, wherein the first and the second audio output terminal are configured to receive a jack of a headphone to receive one or more audio signals from the electronic device simultaneously.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
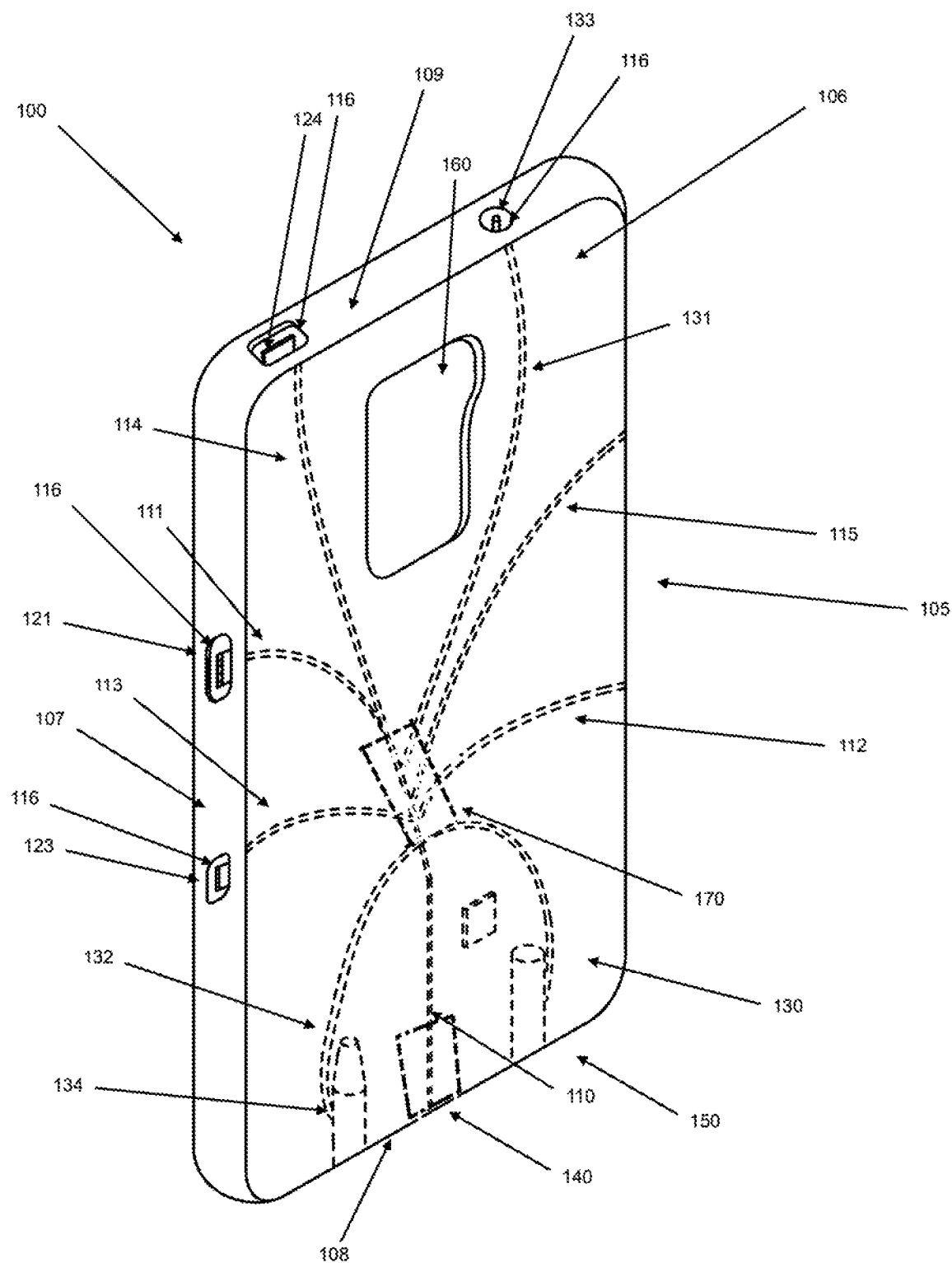
FIG. 1 illustrates a perspective view of a front of a portable electronic device case assembly according to an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and the upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved system and method for a portable electronic device case assembly that provide a casing element that protects the phone while housing all the components for operation. According to one exemplary embodiment, within the casing element there is an integrated auxiliary splitter which allows a user to plug headphones into receptacles on the top, bottom, or both ends of the casing element. The casing element also has integrated charging connectors that allow for multiples types of chargers to work compatibly with the portable electronic device held in the portable electronic device case assembly.

With reference now to FIG. 1, FIG. 1 shows an exemplary embodiment of a portable electronic device case assembly, illustrated as portable electronic device case assembly 100. FIG. 1 shows case assembly 100 from a frontside perspective view and a view of the interior components of case assembly 100. In one embodiment, portable electronic case assembly 100 may be configured to house and enclose a portable electronic device, such as, without limitation, a mobile phone or smartphone. Case assembly 100 is designed having various components as shown in FIG. 1, but one of ordinary skill in the art will understand that other components may be added or removed in other embodiments.

In one embodiment, case assembly 100 may include a casing element such casing element 105. Case assembly 100 may further include a camera opening such as camera opening 160. Case assembly 100 may further include various cables and cords that may be useful to connect to and/or power a portable electronic device. Case assembly may include a main charging cable, such as main charging cable 110. Further, case assembly 100 may include connecting cables such as connecting cables 111, 112, 113, 114, and 115.

Further, case assembly 100 may include an opening, such as opening 116, whose function may be further elaborated upon below. In general, opening 116 may function to provide an opening to access various ports or other areas of interest on case assembly 116. In addition to the above, case assembly may further include several charging adapters such as charging adapters 121, 122, 123, 124, and 125 having connectors on the surface or outside of casing element 105 for connecting cords to be plugged into to charge or provide power portable electronic device from an outlet. Further, case assembly 100 may include an auxiliary splitter, such as auxiliary splitter 130. Auxiliary splitter 130 comprising auxiliary connecting cords 131 and 132, audio output terminals such as audio output terminals 133 and 134, charging connector such as charging connector 140, auxiliary connector such as auxiliary connector 150. In operation, a user would insert portable electronic device into portable electronic device case assembly 100. In one or more non-limiting embodiments, the portable electronic device is a smartphone. In other embodiments, the portable electronic device may be any computing device such as but not limited to a tablet, gaming console, or fitness tracker.

Figure 2:
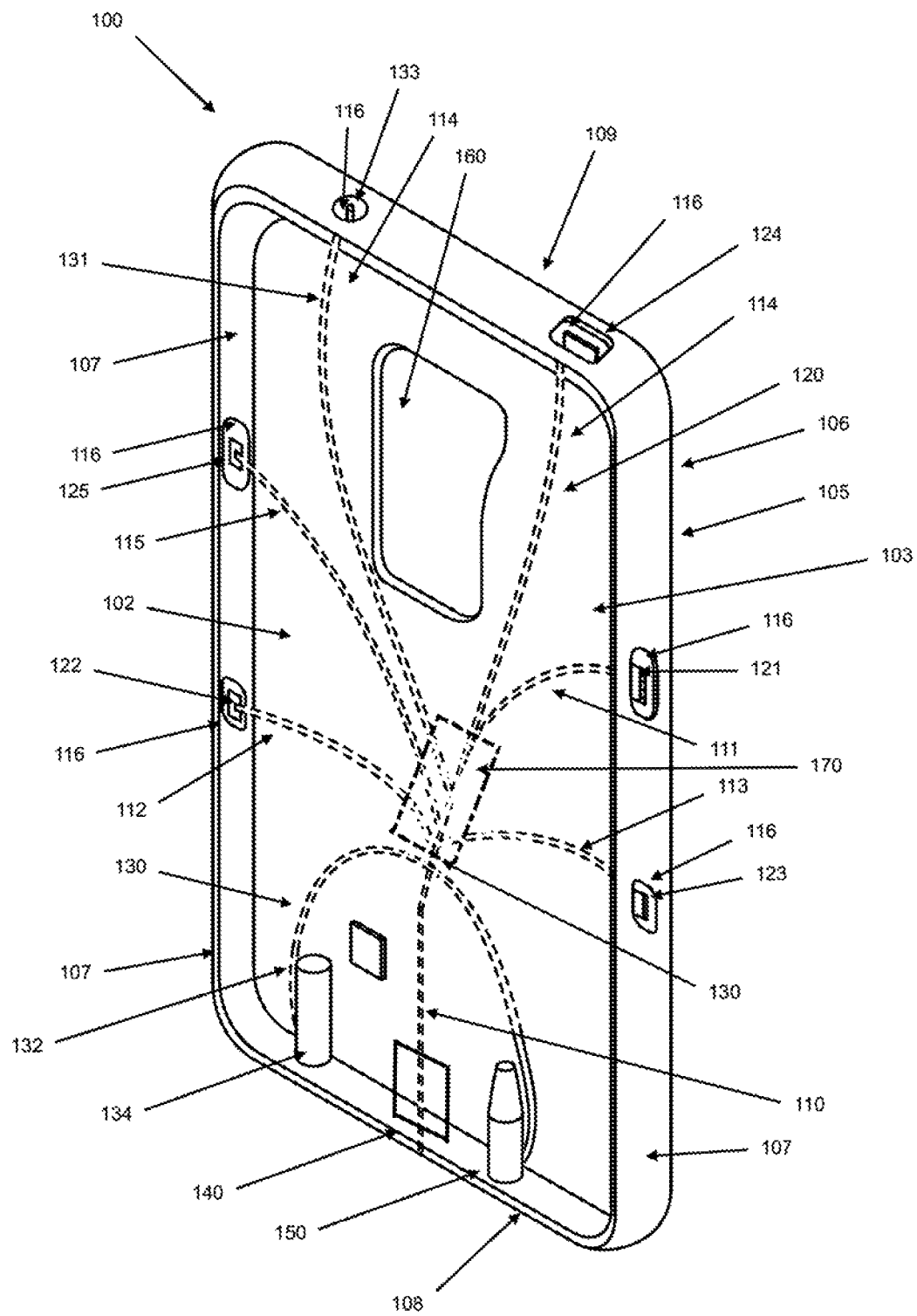
FIG. 2 illustrates a front view of an interior of the portable electronic device case assembly according to an illustrative embodiment.
Figure 3:
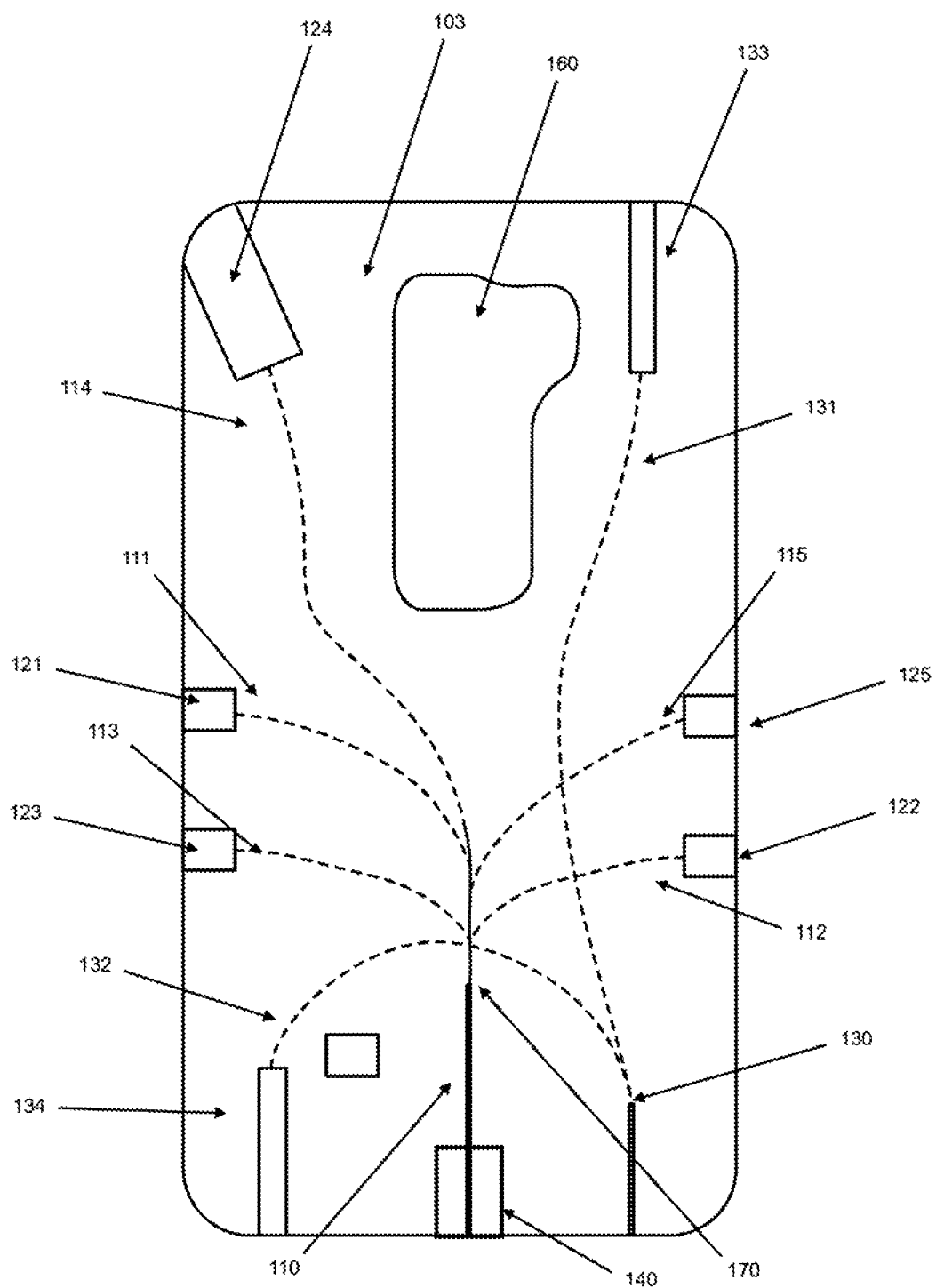
FIG. 3 illustrates a back view of the portable electronic device case assembly according to an illustrative embodiment.
Figure 4:
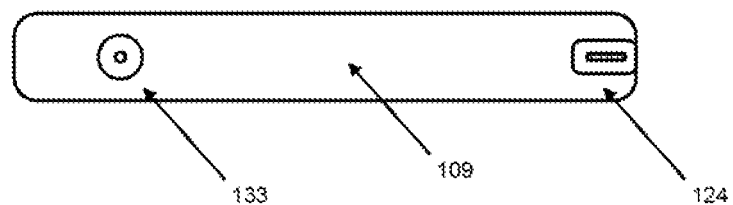
FIG. 4 illustrates a top view of the portable electronic device case assembly according to an illustrative embodiment.
Figure 7:
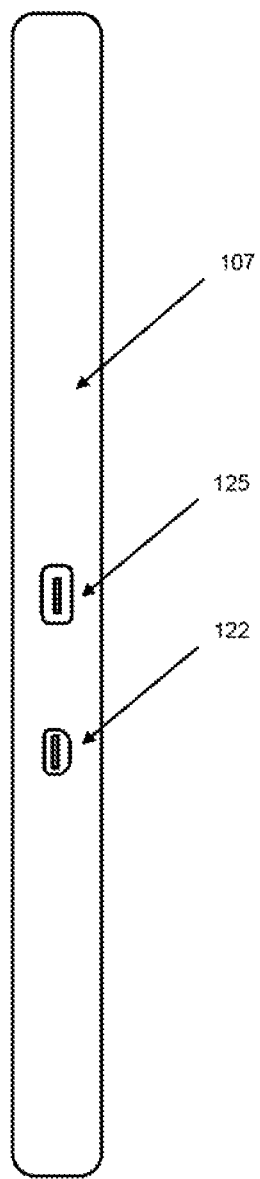
FIG. 7 illustrates a side view of the left of the portable electronic device case assembly according to an illustrative embodiment.
Figure 8:
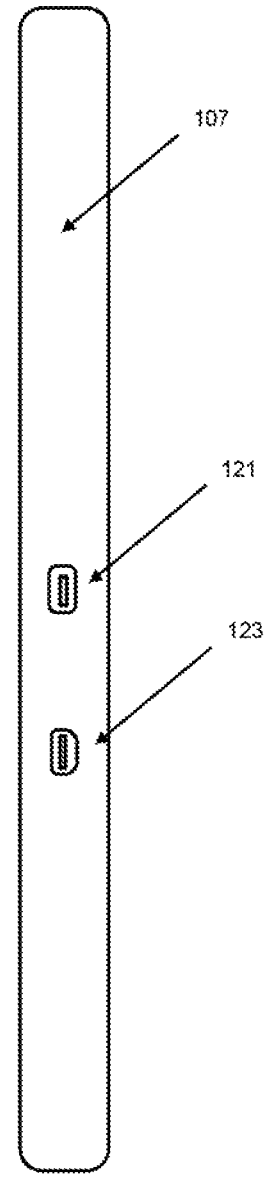
FIG. 8 illustrates a side view of the right side of the portable electronic device case assembly according to an illustrative embodiment.

Casing element 105 may have multiple surfaces, such as an interior surface such as interior surface 102 (as shown in FIG. 2), a back surface such as back surface 106 (as shown in FIG. 3), a plurality of side surfaces, such as side surfaces 107 (as shown in FIG. 7 and FIG. 8), a bottom surface such as bottom surface 108 (shown in FIG. 5), and a top surface such as top surface 109 (as shown in FIG. 4), which are all connected to back surface 106. In some embodiments, casing element 105 may have front surfaces connected to side surfaces 107 wherein the front surfaces may cover the bezel portions of the portable electronic device. In some non-limiting embodiments, casing element 105 may be composed of a flexible material that may also be described as a rubber-like material. In some embodiments, casing element 105 may be composed of materials, such as, but not limited to, an elastomeric, silicone, or rubber inclusive material, whereby when a sufficient force is applied, casing element 105 may have a temporary change in shape that is self-reversing after the force is no longer applied. When the force is no longer applied, casing element 105 returns to its original shape.

In some non-limiting embodiments, the flexible material of casing element 105 allows easy insertion of the portable electronic device by providing a means to stretch casing element 105 to facilitate insertion of the portable electronic device wherein portable electronic device would rest against the interior surface 102 of casing element 105. Conversely, in some non-limiting embodiments, the flexible design of casing element 105 also allows for facilitating the removable of the portable electronic device by providing a means to stretch casing element 105 away from the portable electronic device, thereby providing access to the portable electronic device for removal from casing element 105. In non-limiting embodiments, casing element 105 may be designed to adapt to the model specifications of a particular portable electronic device such as an iPhone® or Samsung galaxy® based on wrapping tightly around the exterior of the portable electronic device. In some non-limiting embodiments, casing element 105 may have a back surface and a plurality of corner sections connected to the back surface, whereby the portable electronic device may be held in place by the corner sections while the remaining portion of the front and side surfaces of the portable electronic device are left exposed. Accordingly, such embodiments would not include side walls or side surfaces 107 as shown in FIG. 1.

In one or more non-limiting embodiments, casing element 105 may be a hard or rigid plastic or a non-elastomeric material such as a polycarbonate. Casing element 105 material may also be a plastic such as a high-density polyethylene, low density polyethylene, thermoplastic, amorphous thermoplastic, or other resin or polymer. In one or more embodiments, casing element 105 may include several layers of varying materials that provide a balance between adequate rigidity and flexibility for the structure of casing element 105. In one or more embodiments, an additional layer of cushioning may be located between one side of interfacing layer 103 and interior surface 102 and back surface 106.

In other non-limiting embodiments, portable electronic device case assembly 100 may also comprise a kickstand (not shown) which may be connected with a hinge or other pivotable connection to back surface 106 of casing element 105. Kickstand may pivot so that a portion of the kickstand extends away from the back surface 106 of casing element 105 and comes in contact with a surface allowing portable electronic device case assembly 100 to lean on the kickstand. This may be useful in multiple scenarios, including for example, when multiple users are watching a movie on the portable electronic device using case assembly 100 and also listening with their headphones plugged into audio output terminals 133 and 134.

In some non-limiting embodiments, openings, such as openings 116, which are shown in different locations on case assembly 100 in FIG. 1, may be located anywhere on casing element 105 so as to easily expose features on a portable electronic device, including items such as charger adapters. Openings 116 may also expose features and components of a portable electronic device such as a flash drive, charging port, headphone jack, power button, volume control, or any other features of portable electronic device which are desired to be exposed in order for those features to work or to access those features. Openings 116 are not limited to the locations shown in the Figures and it should be appreciated that the openings may be moved to different locations to provide suitable openings for any particular portable electronic device's features. Casing element 105 may also include appropriate buttons in addition to open sections or in the place of openings 116 so as to allow for the interaction with control buttons of a portable electronic device, such as a volume control button or a power button. The back surface 106 of casing element 105 may include camera opening 160, whereby camera opening 160 is a closed polygon (e.g., circle, square, or hexagon) having a first area.

In some embodiments, casing element 105 may have multiple layers to provide added protection to a portable electronic device that may be located inside casing element 105. Accordingly, in some configurations, casing element 105 may include an inner casing element and outer casing element, whereby the outer case may be composed of a more rigid material to provide structural stiffness to the case and added resistance to drops, blunt force, or sharp objects. In alternate embodiments, casing element 105 may be separated into different segments, whereby one segment may be detached from the casing element 105 so that the portable electronic device may be inserted into the casing element 105 and then the detached segment is reattached, maintaining the portable electronic device in place within the casing element 105. In some embodiments, the portable electronic device may be removed by removing the detachable segment from casing element 105, and effectively, allowing the portable electronic device to be removed.

Figure 9:
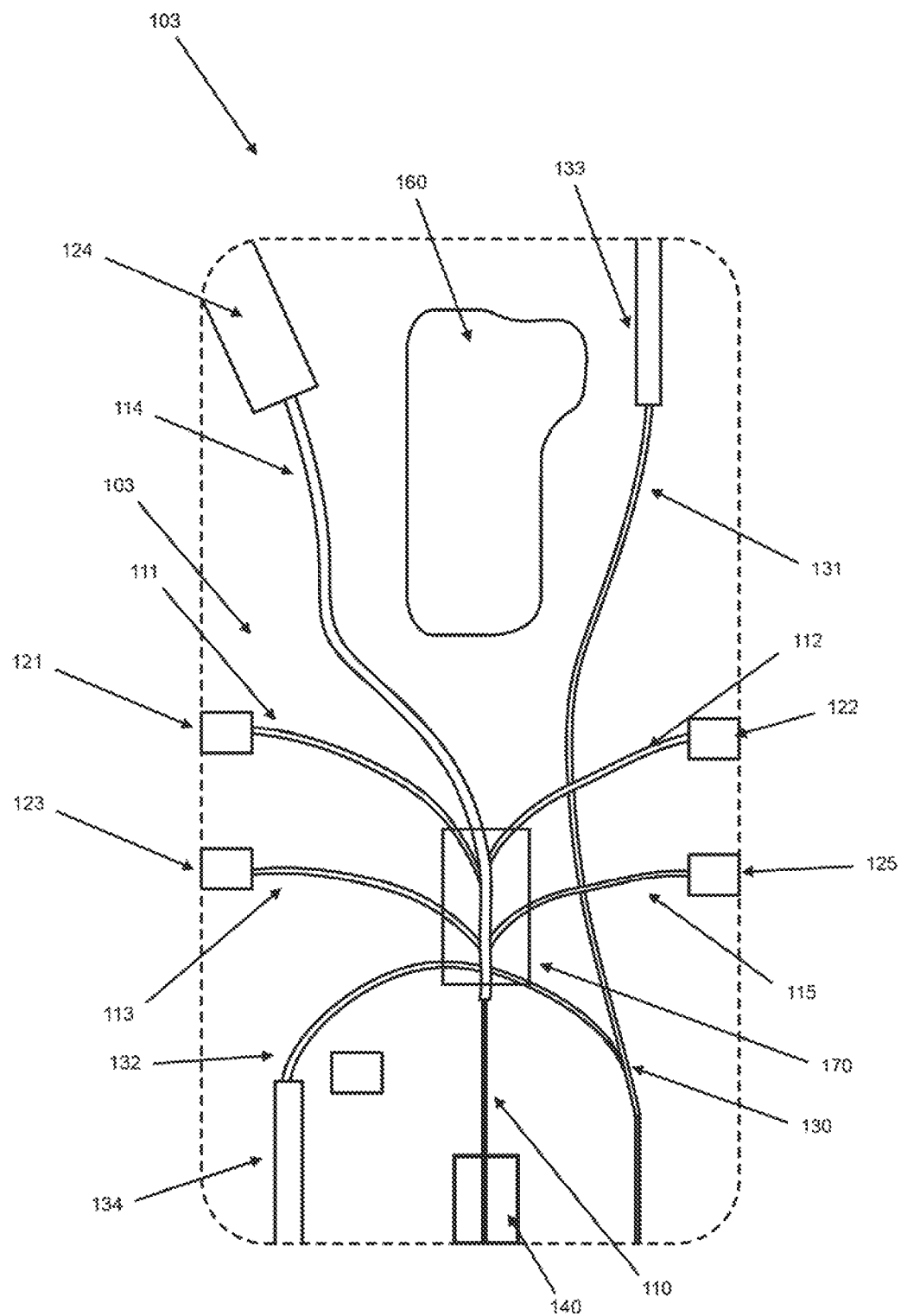
FIG. 9 illustrates a view of internal cables of the portable electronic device case assembly according to an illustrative embodiment.

Casing element 105 may have interfacing layer such as interfacing layer 103 in the interior of casing element 105, as illustrated in FIG. 9, acting as a cavity in the material of casing element 105 wherein interfacing layer 103 does not go through the entire thickness of casing element 105. Interfacing layer may be formed using any process for creating an opening including molding, melting, drilling, and etching. Interfacing layer may also function as a stabilizing and stiffening structural support member for the one or more wires in the interfacing layer.

Portable electronic device case assembly 100 may comprise charging connector 140. Charging connector 140 may be used for connecting to charging port of a portable electronic device suited for case assembly 100. Charging connector 140 may be designed to have a low profile, whereby charging connector 140 minimally protrudes from casing element 105. In one or more embodiments, the portable electronic device is a smartphone having a USB-C connector. Accordingly, portable electronic device case assembly 100 has a corresponding USB-C connector that fits into the portable electronic device connector. For example, portable electronic device case assembly 100 includes a male inner connector that fits into the portable electronic device's female connector. In other embodiments, charging connector 140 may have any number or combination of pins and shapes in order to operate as needed with the portable electronic device for which case assembly 100 is designed.

Through charging connector 140, the circuitry of portable electronic device case assembly 100 interfaces with the portable electronic device, such as for charging the portable electronic device's battery and synchronizing with a computer or other device. Charging connector 140 may be connected to main circuit cable 110, which supplies the voltages and currents to breakout board 170, connecting cables 111, 112, 113, 114, and 115, charging adapters 121, 122, 123, 124, and 125, and through any connected cables plugged into charging adapters 121, 122, 123, 124, and 125. In some embodiments, main circuit cable 110 may detect when the battery is fully charged at which point main circuit cable 110 stops charging the phone. Main circuit cable 110 may be any type of cable having any number of wires that can electronically connect connector 140 to connecting cables 111, 112, 113, 114, and 115 of portable electronic device case assembly 100.

Main circuit cable 110 may be connected to a breakout board, such as breakout board 170, whereby breakout board 170 receives voltage and current from main circuit cable 110 and breaks out and distributes power form main circuit cable 110 to one or more terminals on the breakout board 170 that connects to cables for distribution of power to charging adapters 121, 122, 123, 124, and 125. Breakout board 170 may have one or more opto-couplers or switches that may isolate circuits to prevent an electrical short from one cable affecting another.

In one or more embodiments, each connecting cable 111, 112, 113, 114, and 115 is respectively connected to a charging adapter, such as charging adapters 121, 122, 123, 124, and 125. In one or more embodiments, connecting cables 111, 112, 113, 114, and 115 are wired in parallel, which means positive to positive and negative to negative so as to not increase the voltage to the portable electronic device. In a parallel circuit, the voltage across each of the components is the same, and the total current is the sum of the currents flowing through each component. By charging using the parallel circuitry, the need to disconnect charging adapters and the connecting cords is eliminated, saving the user time and reducing mechanical wear on the case assembly 100 and the portable electronic device that is configured to be located within case assembly 105.

In some embodiments, connecting cable 114 of portable electronic device case assembly 100 may be compatibly connected to charging adapter 125 at a first end of charging adapter 125, as illustrated in FIG. 3, whereby charging adapter 124 is a universal serial bus (USB) adapter, while the second end of charging adapter 124 is a (USB) connector for receiving and connecting to a USB cord. The USB connector may be positioned on or outside top surface 109 of casing element 105. USB connectors are commonly found on host controllers in computers and hubs. The A-style connector for a USB connector is usually a flat, rectangular interface. This interface holds the connection in place, which makes it very easy for users to connect and disconnect. Instead of round pins, the connectors use flat contacts which can withstand continuous attachment and removal very well. The A-style connectors provides a "downstream" connection that is intended for use mainly on host controllers and hubs.

In some embodiments, connecting cables 112 and 113 of portable electronic device case assembly 100 may be compatibly connected to charging adapters 122 and 123 at a first end of charging adapters 122 and 123, as illustrated in FIG. 7 and FIG. 8, wherein charging adapter 122 and are a micro universal serial bus (micro USB) adapter, while a second end of charging adapter 122 and 123 are a micro USB connector for receiving and connecting to a micro USB cord. The micro USB connector may be positioned on or outside multiple side surfaces 107 of casing element 105. Recognized by the USB-IF, these connectors may also be found on newer mobile devices such as cellphones, GPS units, PDAs and digital cameras. Micro-USB B offers a connection physically smaller in size to a USB Mini-b, while still supporting a high speed transfer rate of at least 480 Mbps.

In some embodiments, connecting cable 111 of portable electronic device case assembly 100 may be compatibly connected to charging adapter 121 at a first end of charging adapter 121, as illustrated in FIG. 8, whereby charging adapter 121 is a universal serial bus c adapter (USB-C adapter), while a second end of charging adapter 121 is a USB-C connector for receiving and connecting to a USB-C cord. The USB-C connector may be positioned on or outside side surface 107 of casing element 105. The USB-C connector is a 24-pin USB connector system and has a reversible/symmetrical design. When connected, a USB-C cord (e.g. such as connecting cable 111) may support data transfer rates that are twice the speed of existing USB technology (up to 10 Gbit/s), enhanced power delivery of up to 20 volts, 5 amps, and 100 watts for power and charging, and built-in support for DisplayPort video and four channel audio.

In some embodiments, connecting cable 115 of portable electronic device case assembly 100 may be compatibly connected to charging adapter 125 at a first end of charging adapter 125, as illustrated in FIG. 7 whereby charging adapter 125 is a lightning adapter, while a second end of charging adapter 125 is a lightning connector for receiving and connecting for receiving and connecting to a lightning cord. The lightning connector may be positioned on or outside side surface 107 of casing element 105. Lightning connectors are 8-pin connectors which carry a digital signal. Lightning connectors were introduced in 2012 with the arrival of the iPhone 5 and is propriety to and invented by Apple®.

However, the embodiments described above are intended to be non-limiting, and the charging adapters 121, 122, 123, 124, and 125 included with case assembly 105 may be customized according to actual needs, provided that one end of the charging adapter must be compatible with the charging connector. That is to say, if the charging connector is a Micro USB male, then one end of the charging adapter should be a Micro USB female, while the other end of the charging adapter may be customized according to the interface protocol of the portable electronic device. In other embodiments, connectors, such as, but not limited to mini USB, may be used. Also, other types of connectors such as FireWire (i.e., an IEEE 1394 interface, or Lynx), eSATA, or another proprietary connector may be used instead of or in addition to the connectors used above.

The length of the connected cords to charging adapters typically range from about 0.3 meters to about 3 meters. However, this range of measurement is non limiting and the connected cords may also be less than 0.3 meters or more than 3 meters. The variations in connected cord length reflect the many different preferences that users may have. For example, a user may want the case assembly 105 to be located nearby with a cord that allows for proximate charging on a night stand or have a cord that also charges over long distances such as on an outdoor patio whereby the portable electronic device is connected to a second computing device that is a distance away.

Figure 5:
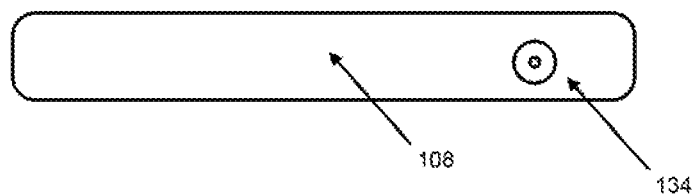
FIG. 5 illustrates a bottom view of the inside of the portable electronic device case assembly according to an illustrative embodiment.
Figure 6:
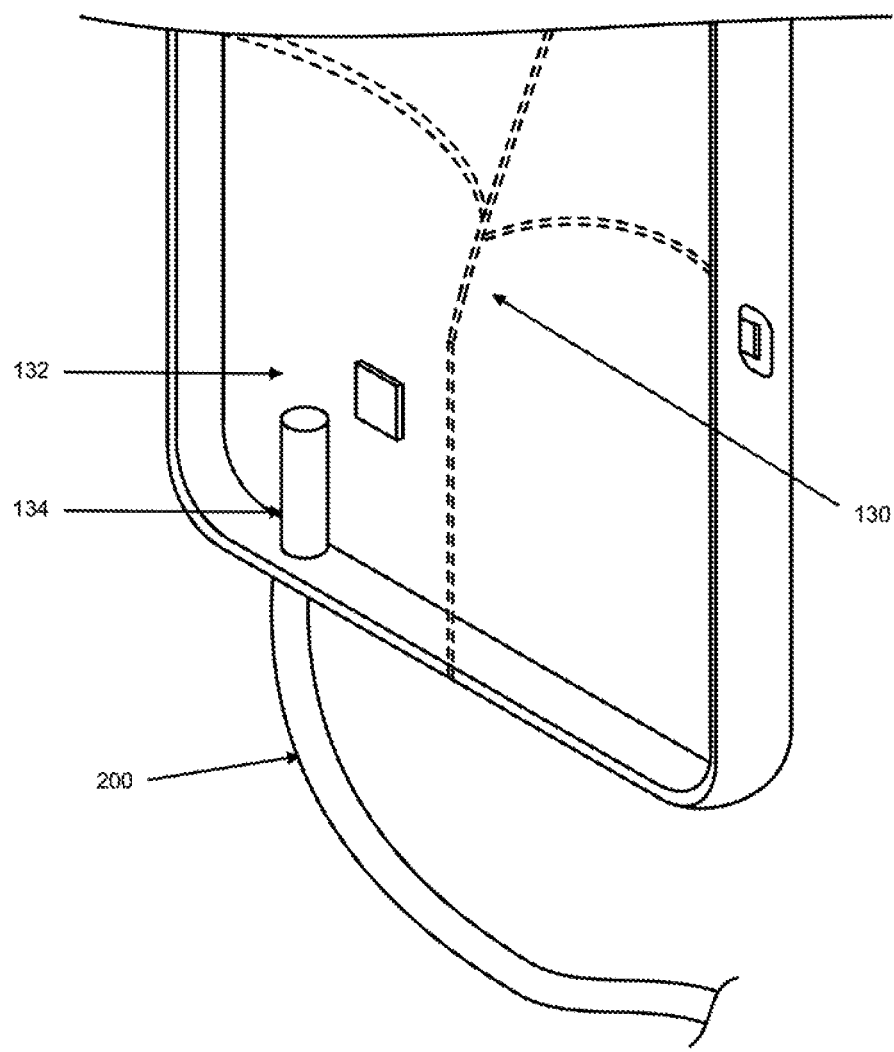
FIG. 6 illustrates a bottom view of the inside of the portable electronic device case assembly with a connected auxiliary cord.

Portable electronic device case assembly 100 may also comprise auxiliary connector 150 which is compatibly connected to auxiliary splitter 130, as illustrated in FIG. 6. Auxiliary connector 150 may be designed to have a low profile, whereby auxiliary connector 150 minimally protrudes from and is positioned on the outside of bottom surface 108 of casing element 105, as illustrated in FIG. 5. Auxiliary connecter 150 is coupled through auxiliary splitter 130 to the audio output terminal 133 and 134 of the electronic device. Through auxiliary connector 150, the circuitry of auxiliary splitter 130 of portable electronic device case assembly 100 interfaces with the portable electronic device, such as for receiving audio from the audio output port of the portable electronic device. Auxiliary splitter 130 is configured to take the incoming audio electrical signal from the audio output of the portable electronic device and to create multiple channels through audio cables 131 and 132 having identical electrical signals from the single audio output. These electronic signals may be transmitted to audio output terminals 133 and 134, which may be accessible to headphones or other audio accessories (e.g. auxiliary cords) of individual users, such as headphone cord 200 plugged into audio output terminal 134 as shown in FIG. 6, so that they may all independently listen to the audio from the portable electronic device that is located within the confines of case assembly 105. Audio output terminal 133 may be positioned on or outside top surface 109 of casing element 105, as shown in FIG. 4. Audio output terminal 134 may be positioned on or outside bottom surface 108 of casing element 105, as shown in FIG. 5.

In one embodiment, when only one headphone is plugged into receptacle 133 and 134 of auxiliary splitter 130, the headphones operate normally. If an extra headphone is plugged into second audio output terminal 133 or 134, both headphones plugged into audio output terminals 133 and 134 may provide audio output or sound to their respective listeners. The one or more embodiments described herein include well-known variants of headphones, plugs, and jacks, including versions that are monaural and stereo, versions with and without microphones, and versions with various pin orderings. In operation, an audio electrical signal goes from the portable electronic device through auxiliary splitter to produce two identical signals if two headphones are plugged into audio output terminal 133 and audio output terminal 134

In some embodiments, an authentication circuit may be included in the circuitry to provide proper authentication to the portable electronic device. This authentication circuit may connect to the other circuitry of the case through a microcontroller or other interface.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A case for an electronic device, comprising:
   a casing element comprising a back surface, wherein the back surface comprises an interfacing layer enclosed in the casing element;
   one or more sidewalls connected to the back surface;
   an auxiliary splitter and auxiliary connector, wherein the auxiliary connector is has output terminals positioned on an outside of the casing element through openings in the casing element, wherein the auxiliary connector is coupled through the auxiliary splitter to an audio output port of the electronic device, wherein the auxiliary splitter is configured to send electrical signals from the electronic device to a first and a second audio output terminal, wherein the first and the second audio output terminal are configured to each receive a headphone jack for headphone to receive one or more audio signals from the electronic device to be played simultaneously on the headphone; and
   electronic circuitry located in the interfacing layer, wherein the electronic circuitry comprises a plurality of charging adapters, connecting cords, and a breakout board, that allow for multiples types of chargers to work compatibly with the electronic device wherein the connecting cords are wired in parallel.

2. A case for an electronic device, comprising:
   a casing element comprising a back surface and an interfacing layer enclosed in the casing element, wherein the electronic device is configured to be placed against the back surface of the casing element and on top of the interfacing layer;

one or more sidewalls connected to the back surface;
an auxiliary splitter and auxiliary connector, wherein the auxiliary connector is positioned on an outside of the casing element, wherein the auxiliary connector is coupled through the auxiliary splitter to an audio output port of the electronic device, wherein the auxiliary splitter is configured to send electrical signals from the electronic device to a first and a second audio output terminal, wherein the first and the second audio output terminal are configured to each receive a jack of a headphone to receive one or more audio signals from the electronic device simultaneously, wherein the first audio output terminal extends from a top of the casing element wherein the second audio output terminal extends from a bottom of the casing element; and electronic circuitry in the interfacing layer, wherein the electronic circuitry comprises a plurality of charging adapters, wherein connecting cables are connected to the plurality of charging adapters at a first end and wherein a second end of the connecting cables is a connector for receiving and connecting a compatible cord, wherein the connecting cables are accessible through one or more openings in the one or more sidewalls of the casing element wherein the plurality of charging adapters are configured to charge the electronic device by various different types of cords, wherein the case has a charging connector, wherein the charging connector is positioned on the outside of the casing element, wherein the charging connector is coupled through the electronic circuitry to a charging port of the electronic device, wherein the charging connector is configured to connect to a charging cable, wherein the charging cable is configured to connect to a breakout board, wherein the breakout board is configured to distribute power to the connecting cables from a main charging cable.

3. The case of claim 2, wherein one of the plurality of charging adapters is a lightning adapter, wherein a connecting cable of the connecting cables is configured to connect to the lightning adapter at a first end, wherein a second end of the lightning adapter is a lightning connector for receiving and connecting to a lightning cord.

4. The case of claim 3, wherein one of the plurality of charging adapters is a micro USB adapter, wherein a connecting cable of the connecting cables is configured to connect to the micro USB adapter at a first end, wherein a second end of the micro USB adapter is a micro USB connector for receiving and connecting to a micro USB cord.

5. The case of claim 4, wherein one of the plurality of charging adapters is a USB adapter, wherein a connecting cable of the connecting cables is configured to connect to the USB adapter at a first end, wherein a second end of the USB adapter is a USB connector for receiving and connecting to a USB cord.

6. The case of claim 5, wherein one of the plurality of charging adapters is a USB C adapter, wherein the connecting cable of the connecting cables is configured to connect to the USB C adapter at a first end, wherein a second end of the USB C adapter is a USB C connector for receiving and connecting to a USB C cord.

7. A case for an electronic device, comprising:
a casing element comprising a back surface and an interfacing layer enclosed in the casing element, wherein the electronic device is configured to be placed against the back surface of the casing element and on top of the interfacing layer;

one or more sidewalls connected to the back surface; and
electronic circuitry in the interfacing layer, wherein the electronic circuitry comprises a plurality of charging adapters and an auxiliary splitter, wherein one or more connecting cables are connected to the plurality of charging adapters at a first end and wherein a second end of the one or more connecting cables is a connector for receiving and connecting a compatible cord, wherein the one or more connecting cables are accessible through one or more openings in the one or more sidewalls of the casing element, wherein one of the plurality of charging adapters is a lightning adapter, wherein a connecting cable of the one or more connecting cables is configured to connect to the lightning adapter at a first end, wherein a second end of the lightning adapter is a lightning connector for receiving and connecting to a lightning cord, wherein one of the plurality of charging adapters is a micro USB adapter, wherein a second connecting cable of the one or more connecting cables is configured to connect to the micro USB adapter at a first end, wherein a second end of the micro USB adapter is a micro USB connector for receiving and connecting to a micro USB cord, wherein one of the plurality of charging adapters is a USB adapter, wherein a third connecting cable of the one or more connecting cables is configured to connect to the USB adapter at a first end, wherein a second end of the USB adapter is a USB connector for receiving and connecting to a USB cord, wherein one of the plurality of charging adapters is a USB C adapter, wherein a fourth connecting cable of the one or more connecting cables is configured to connect to the USB C adapter at a first end, wherein a second end of the USB C adapter is a USB C connector for receiving and connecting to a USB C cord, the case having a charging connector, wherein the charging connector is positioned on an outside of the casing element, wherein the charging connector is coupled through the electronic circuitry to a charging port of the electronic device, wherein the charging connector is configured to connect to a charging cable, wherein the charging cable is configured to connect to a breakout board, wherein the breakout board is configured to distribute power to the one or more connecting cables, the case having an auxiliary connector, wherein the auxiliary connector is positioned on the outside of the casing element, wherein the auxiliary connector is coupled through the auxiliary splitter to an audio output port of the electronic device, wherein the auxiliary splitter is configured to send electrical signals to a first and a second audio output terminal, wherein the first and the second audio output terminal are configured to receive a jack of a headphone to receive one or more audio signals from the electronic device simultaneously.

8. A case for an electronic device, comprising:
a casing element comprising a back surface, wherein the back surface comprises an interfacing layer enclosed in the casing element;

one or more sidewalls connected to the back surface; and
an auxiliary splitter and auxiliary connector, wherein the auxiliary connector is positioned on an outside of the casing element, wherein the auxiliary connector is coupled through the auxiliary splitter to an audio output port of the electronic device, wherein the auxiliary splitter is configured to send electrical signals received from the electronic device to a first and a second audio output terminal, wherein the first and the second audio output terminal are configured to receive a jack of a headphone to receive one or more audio signals from the electronic device simultaneously, wherein the first audio output terminal extends from a first side of the casing element wherein the second audio output terminal extends from a second side of the casing element.

9. The case for the electronic device of claim 8, wherein the casing element has opto-couplers or switches that isolate circuits to prevent an electrical short from one cable affecting another.

\* \* \* \* \*